(12) United States Patent  
Hoffjann et al.

(10) Patent No.: US 7,947,164 B2  
(45) Date of Patent: May 24, 2011

(54) AIRCRAFT WITH GREY-WATER UTILISATION SYSTEM

(75) Inventors: Claus Hoffjann, Hamburg (DE); Andreas Tutass, Hamburg (DE); Hans-Juergen Heinrich, Hamburg (DE)

(73) Assignee: Airbus Deutschland GmbH (DE)

( * ) Notice: Subject to any disclaimer, the term of this patent is extended or adjusted under 35 U.S.C. 154(b) by 1503 days.

(21) Appl. No.: 11/349,880

(22) Filed: Feb. 8, 2006

(65) Prior Publication Data

US 2007/0102370 A1    May 10, 2007

Related U.S. Application Data

(60) Provisional application No. 60/651,674, filed on Feb. 10, 2005.

(30) Foreign Application Priority Data

Feb. 10, 2005   (DE) .......................... 10 2005 006 136

(51) Int. Cl.
C02F 1/32    (2006.01)

(52) U.S. Cl. ................................... 205/742; 210/748.01

(58) Field of Classification Search .................. 210/748, 210/86, 195.1, 258, 259, 411; 205/742
See application file for complete search history.

(56) References Cited

U.S. PATENT DOCUMENTS

| | | | | |
|---|---|---|---|---|
| 3,523,891 A | * | 8/1970 | Mehl | .............................. 210/707 |
| 3,562,137 A | | 2/1971 | Gehring | |
| 3,943,044 A | | 3/1976 | Fenn, III et al. | |
| 4,063,315 A | | 12/1977 | Carolan et al. | |
| 4,871,452 A | * | 10/1989 | Kohler et al. | .............. 210/167.3 |
| 5,454,936 A | * | 10/1995 | Ask et al. | ......................... 210/86 |
| 5,711,038 A | | 1/1998 | Niethammer et al. | |
| 6,800,206 B2 | * | 10/2004 | Robinson | ....................... 210/746 |
| 2004/0045910 A1 | | 3/2004 | Hoffjann et al. | |

FOREIGN PATENT DOCUMENTS

| | | |
|---|---|---|
| DE | 4123803 | 1/1993 |
| DE | 4307102 | 9/1994 |
| DE | 19939188 | 3/2001 |
| DE | 10229799 | 1/2004 |
| EP | 0530859 | 3/1993 |
| WO | 0117911 | 3/2001 |

* cited by examiner

Primary Examiner — Walter D Griffin  
Assistant Examiner — Cameron J Allen  
(74) Attorney, Agent, or Firm — Lerner, David, Littenberg, Krumholz & Mentlik, LLP

(57) ABSTRACT

A grey-water utilisation system for an aircraft for treating grey water from the lavatory basins to become odourless clear water used for flushing the toilets. Freight compartment drainage can be by way of drainage valves embedded in the fuselage, or alternatively, by way of removal by suction into a waste-water collection tank.

21 Claims, 2 Drawing Sheets

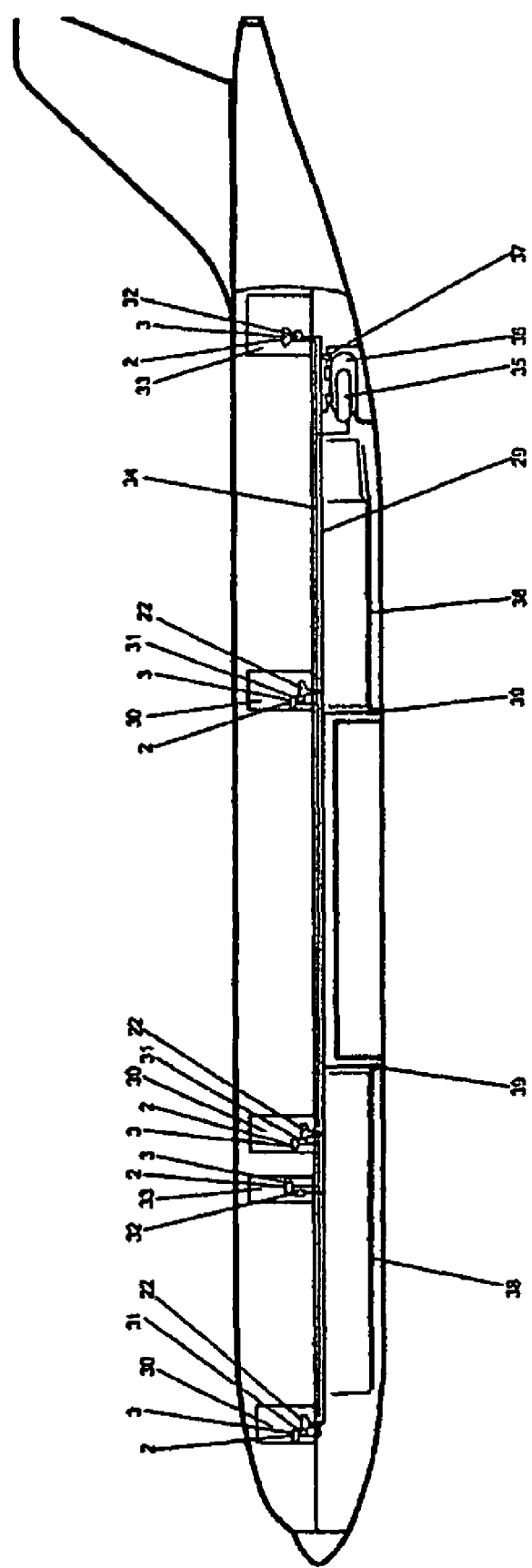

AIRCRAFT WITH GREY-WATER UTILISATION SYSTEM

CROSS-REFERENCE TO RELATED APPLICATIONS

This application claims the benefit of the filing date of U.S. Provisional Patent Application No. 60/651,674 filed Feb. 10, 2005, the disclosure of which is hereby incorporated herein by reference.

BACKGROUND OF THE INVENTION

The present invention relates to grey-water utilisation in aircraft. In particular the present invention relates to a grey-water utilisation system for an aircraft; an aircraft comprising a grey-water utilisation system; and the use of a corresponding grey-water utilisation system in an aircraft.

Today's commercial aircraft use vacuum toilet systems in which sewage is conveyed from the toilet bowl to a waste-water tank by means of the airstream resulting from the pressure differential between the sewage tank and the cabin. In order to support this conveyance and to clean the toilet bowl, in each flushing action a small amount of water is sprayed into said toilet bowl by way of a spray ring. The water used for this purpose is potable water that originates from the on-board potable-water tanks and has to be carried along in addition for this sole purpose.

Furthermore, grey-water systems are used which convey the used water from lavatory basins, galley sinks and freight-compartment drainage to the outside by way of so-called drain masts, i.e., heated outlet stubs on the underside of the fuselage. These drain masts contribute to increased air resistance.

SUMMARY OF THE INVENTION

Amongst other things, it may be an object of the present invention to provide improved utilisation of grey water in an aircraft.

According to one exemplary embodiment of the present invention the above object may be met by means of a grey-water utilisation system for an aircraft, which grey-water utilisation system comprises a grey-water treatment device, a waste-water collection tank and a vacuum system, wherein the grey-water treatment device is designed to treat grey water so that it becomes first clear water, which subsequently can be used for flushing the toilet, and wherein the vacuum system is designed to collect waste water in the waste-water collection tank.

By treating grey water within an aircraft, which grey water can subsequently be used for flushing the toilet, a considerable reduction in the quantity of potable water that has to be carried along may be achieved. This may lead to savings in weight.

Furthermore, as a result of the grey-water utilisation according to the invention savings in grey-water lines can be achieved. Due to treatment and re-use of the grey water within the aircraft the otherwise required drain mast can be done without, which not least results in improved aerodynamics and in a reduction in air resistance. Furthermore, in this way the expenditure relating to heating systems may be reduced.

According to another exemplary embodiment of the present invention the waste water comprises first flush water from the toilet or second rinse water from a galley region, while the grey water comprises third rinse water from a wash basin.

Dirty waste water from the on-board toilet or the galley region may thus be collected in the waste-water collection tank, wherein less dirty grey water from a lavatory basin or sink may be fed to a grey-water treatment device. In the grey-water treatment device, for example dirt particles, turbidity and odorous substances are then removed from the grey water, which can then be fed as clear water, for example to the on-board toilet.

According to a further embodiment of the present invention the grey-water treatment device is connected to the wash basin and the toilet such that the third rinse water from the wash basin can be treated in the grey-water treatment device so that it turns into second clear water and can subsequently be fed to the toilet.

In this way, after treatment, rinse water from the lavatory basin can be used for flushing a nearby toilet, so that for example pipelines from a (large) clear-water tank can be saved.

According to a further embodiment of the present invention, the grey-water treatment device comprises an electroflotation stage and/or a filtration stage, wherein the electroflotation stage is designed to clean from the grey water any floatable materials contained in the water, and wherein the filtration stage is designed to filter the grey water.

By using the principle of electroflotation to clean the grey water, fast, thorough and effective separation of suspended solids from the grey water can be achieved. With the filtration stage coarse suspended solids can quickly be removed from the grey water. According to the invention, electroflotation and filtration can be used as an alternative or combined with each other.

According to a further embodiment of the present invention the second rinse water is collected in a first collecting basin and is released to the vacuum system by way of an overflow device with a float valve or by way of a suction valve on the bottom of the collecting basin.

In this way, an intermediate buffer may be provided so that for example the vacuum system needs to be used less frequently.

According to a further embodiment of the present invention a separate drainage device for draining a freight compartment of the aircraft is provided, wherein the drainage device comprises drainage valves embedded in the fuselage, or is connected to the vacuum system by way of a second collecting basin.

In this way, for example any quantities of liquid that have leaked in flight from the freight can be disposed into the waste-water tanks.

According to a further embodiment of the present invention a clarifier-foam suction device is provided for sucking a clarifier foam from the grey-water treatment device by way of the vacuum system or a first overflow that is provided in the grey-water treatment device.

This may ensure that the clarifier foam that collects in the grey-water treatment device is removed in time, before it can have a negative effect on the water in the grey-water treatment device. The clarifier-foam suction can for example take place by way of a valve which connects the treatment stage to the vacuum system, wherein this valve is for example controlled automatically and this automatic control takes place at defined time intervals based on a specified time pulse or based on measuring the clarifier-foam layer.

The first overflow may prevent any overflow of the grey-water treatment device. To this effect the overflow can for example comprise a float valve that connects the treatment container with the vacuum system and that is opened by the rising float when the maximum fill level has been reached, wherein the excess liquid is sucked off by the vacuum system.

According to a further embodiment of the present invention the first or second clear water is collected in an intermediate container, wherein the intermediate container comprises a second overflow.

For example, the second overflow can comprise a second float valve which connects the intermediate container with the vacuum system and which when the maximum fill level has been reached is opened by the rising second float, wherein the excess liquid is sucked off by the vacuum system.

According to a further embodiment of the present invention a first drainage device or a second drainage device is provided, wherein the grey water treatment device can be drained using the first drainage device, and wherein the intermediate container can be drained using the second drainage device.

According to a further embodiment of the present invention a pressure cylinder combination is provided, by way of which pressure cylinder combination clear water is sucked from the intermediate container and subsequently, in a further step, is fed into the toilet by way of a spray ring.

The pressure cylinder combination provides an effective device for flushing the on-board toilet with clear water that is pumped out of a storage container that is provided for this purpose.

According to a further embodiment of the present invention the free hydrogen molecules that arise during treatment using electroflotation are oxidised within the housing of the grey-water treatment device so that water is produced.

In this way the danger of explosion that is present as a result of hydrogen arising may be reduced or excluded altogether.

According to a further embodiment of the present invention forced aeration of the housing of the grey-water treatment device is provided, through which atmospheric oxygen can be introduced so that released hydrogen with the (external) atmospheric oxygen can be converted to water.

Furthermore, an electronic control device can be provided through which the grey-water utilisation system can be automatically controlled or regulated. To increase system safety, the individual control elements are redundant so that if there is any malfunction or failure of one of the elements, a corresponding other control element can take over its function.

Furthermore, according to one embodiment, a first water shortage in the clear-water intermediate tank can be detected by way of sensors so that for example by way of the electronic control system a subsequent wash procedure in a washroom can be extended until this water shortage is remedied.

Furthermore, a grey-water receiver and the electroflotation stage can be interconnected on the floor side according to the principle of communicating pipes. According to one embodiment the electroflotation device and the filtration stage are connected on the surface side according to the overflow principle.

In order to prevent hydroxides from depositing on the electrodes of the electroflotation stage, the polarity of the direct voltage applied to the electrodes can periodically be reversed.

Further objects, embodiments and advantages of the invention are stated in the secondary independent claims and in the dependent claims.

Below, the invention is described in more detail by means of exemplary embodiments with reference to the drawings.

BRIEF DESCRIPTION OF THE DRAWINGS

In the drawings:

FIG. 2 shows a diagrammatic cross sectional view of an aircraft with a grey-water utilisation system according to one embodiment of the present invention.

In the following description of the figures the same reference characters are used for identical or similar elements.

DETAILED DESCRIPTION

Figure 1:
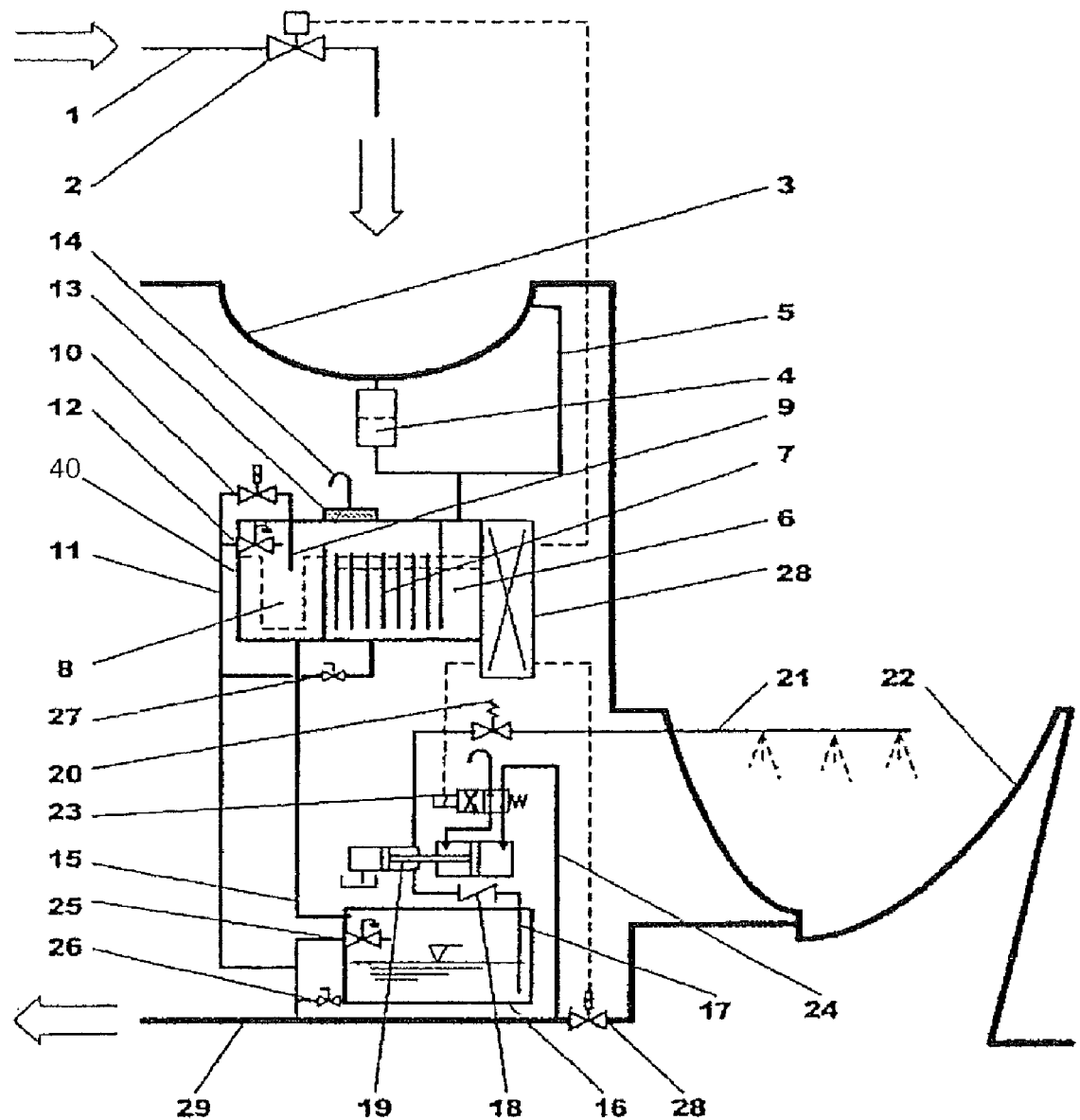
FIG. 1 shows a diagrammatic illustration of a grey-water utilisation system according to one embodiment of the present invention.

FIG. 1 shows a diagrammatic representation of a grey-water utilisation system according to one embodiment of the present invention. As shown in FIG. 1 the grey-water utilisation system comprises a grey-water treatment device 7, 8, a waste-water collection tank 36 and a vacuum system 29.

The water (grey water) that during a cleaning process flows by way of the water cock 2 from the potable water system 1 to the wash basin 3, which water comprises dirt particles, organic substances as well as soap or tensides, is channelled by way of a coarse sieve 4 into the receiver container 6 of the grey-water treatment device 7, 8.

The aircraft comprises a vacuum system 29 to collect waste water in at least one waste-water collection tank 36, wherein the vacuum system is impinged on by a vacuum by way of the collection tank 36, which vacuum is generated either by way of the differential pressure between the aircraft cabin pressure and the low external pressure at flight altitude, or by way of the differential pressure between the aircraft cabin pressure and the container pressure in the waste-water collection tank 36, which by way of a vacuum generator 37 is brought to an internal pressure that is lower than the cabin pressure (see FIG. 2).

In the aircraft equipped in this way, drinking water from at least one fresh water tank 35 (see FIG. 2) or obtained by way of a water generating system such as for example a fuel cell system (not shown) is provided and at defined bleeding points is supplied to passengers or to the aircrew by way of water cocks 2. Underneath these bleeding points two collection basins in the form of wash basins 3 may be located, wherein these wash basins are preferably installed in the galley regions 33 (see FIG. 2) and in the lavatories 30, and wherein at least part of the lavatories also contain toilets 22 that in turn are connected to the vacuum system by way of a rinse valve or suction valve 28 and an electronic control box 29. Reference character 5 designates the wash basin overflow while reference character 24 designates a vacuum control line.

In addition the aircraft comprises at least one grey-water treatment device 6 to 14 which, if there are several grey-water treatment devices 31, is either centrally or decentrally connected to the wash basins 3, 4 and toilets 22 installed in the lavatories 30 such that the water that is collected in the wash basins can be treated to become clear water, i.e. water that is free of any dirt particles, turbidity and odorous substances, and can be fed to the toilet flushing system 16 to 21.

From the receiver container 6 the soiled water flows according to the principle of communicating pipes into the treatment device 7, which is an electroflotation stage.

The receiver container 6 and the treatment device 7 are thus for example interconnected in their lower region by way of corresponding lines so that the water, according to the principle of communicating pipes, attempts to find the same level in the receiver container 6 and in the treatment device 7.

In the treatment container 7, in the liquid, there are electrodes that have been installed vertically, for example electrodes made from iron, aluminium or zinc, which are connected to a source of electricity in such a way that the polarity of the metal plates can be reversed at defined time intervals.

For example, a constant direct voltage is applied to the electrodes of the electroflotation stage so that the flow of current adjusts itself automatically depending on the ion conductivity of the water to be cleaned. Furthermore, the polarity of the direct voltage applied to the electrodes can periodically be reversed so that hydroxide deposits on the electrodes are prevented.

The cleaning process takes place e.g. with the use of iron electrodes by forming $Fe^{2+}$ ions from the anode (anodic dissolution). These ions, together with $OH^-$ ions that are contained in the water form ferrous hydroxide that has good adsorbability and binds dirt particles so that flocculation occurs. Any hydrogen that is contained in the water then deposits on these flocculation particles so that they rise and form a gel-like clarifier foam on the surface, which clarifier foam is from time to time sucked off into the vacuum system 29 by way of the clarifier-foam suction device 9 and the suction line 11 in that the suction valve 10 is opened.

In this way removal of clarifier foam by way of suction takes place by way of a valve 10 which connects the grey-water treatment stages 7, 8 with the vacuum system 11, 29, wherein this valve 10 is automatically controlled and wherein automatic control takes place at determined intervals that are either controlled by a specified time pulse or based on measuring the thickness of the layer of clarifier foam. For example, determining the thickness of the layer of clarifier foam can take place by optical measuring, for example in the form of a photoelectric barrier, or in the form of ultrasonic measuring.

Setting the pH value or forming $H^+$ and $O^{H-}$ ions takes place as a result of the electrolytic effect of the plates exposed to voltage or current have on the water. In this process $H_2O$ is broken down into $H^+$ and $O^{2-}$, wherein the $H^+$ ions immediately combine to $H_2$ molecules, while the $O^{2-}$ ions together with free $H^+$ ions form $OH^-$ groups that then combine with the $Fe^{2+}$ ions to form $Fe(OH)_2$ (ferrous hydroxide).

In order to prevent deposits of a ferrous hydroxide layer on the anodic plates, their polarity is reversed at specified intervals.

The water clarified in this way is separated from the clarifier foam by way of a filter or a filter system 8 and is then fed in the form of odourless clear water to the clear-water storage tank 16 by way of the line 15.

In order to prevent any overflow of the treatment stage and of the clear-water storage tank, they are connected to the vacuum system 29 by way of float valves 12, 25 and the suction line 11.

When a fill maximum has been reached, the rising float can thus open the float valve 12, wherein the excess liquid is removed by suction by way of the vacuum system 11, 29.

Equipment that carries water in aircraft has to be drainable. This function is ensured by way of the manually operated drainage valves 26, 27.

Since during electroflotation free hydrogen forms and this hydrogen must not leave the system and enter the interior of the aircraft (formation of detonating gas or oxyhydrogen gas), the hydrogen is converted to water by way of a catalytic converter 13 using atmospheric oxygen, wherein atmospheric oxygen enters the system by way of an aeration device 14.

The manually operated drainage valve 26 interconnects the intermediate container 16 and the vacuum system 29; said manually operated drainage valve 26 is installed at an outlet stub of the intermediate container 16, which outlet stub is the lowest point in the intermediate container.

The overflow 25 for example comprises a float valve that can establish a connection between an intermediate container 16 and the vacuum system 29 and that is opened by the rising float when the fill level maximum has been reached, wherein excess fluid is removed by suction by means of the vacuum system 29.

In one embodiment the intermediate container 16 is affixed underneath the toilet bowl 22, wherein the intermediate container 16 and the toilet bowl 22 form a unit. The top of the intermediate container 16 matches the outer shape of the toilet bowl 22. In one embodiment of the present invention the intermediate container 16 forms an inseparable unit with the toilet bowl 22.

Drainage of the treatment stage 7, 8 is by way of the manually operated valve 27 which interconnects the treatment stage 7, 8 with the vacuum system 11, 29, and which is attached to an outlet stub of the treatment stage 7, 8 that is the lowest point of the treatment stage.

Flushing the toilet bowl takes place as explained below. A prerequisite for this is the existence of a so-called vacuum, normal in aircraft, in the vacuum system, which vacuum represents the differential pressure between the air pressure in the cabin and the external pressure in the waste-water pipes of the aircraft, and, unlike a true vacuum, is a partial vacuum of approx. 500 mbar. This value can vary depending on the aircraft type. If the vacuum system is operated with a blower (vacuum generator) that is common in aircraft, the pressure difference can be as low as approx. 250 mbar.

By way of the suction line 17 and the nonreturn valve 18 the clear water enters the water chamber of a cylinder combination 19. On the water side, said cylinder combination 19 comprises a piston which by way of a rod is connected to a vacuum part which can be moved by way of a directional control valve 23 by means of a second piston and by applying the vacuum to the one end or to the other end of the piston. If the vacuum is applied to the rod end of the piston, the water chamber is filled by suction. If the directional control valve 23 is switched over, the end of the piston that faces away from the rod is impinged on by a vacuum, and the piston of the water chamber presses the water against a spring-loaded overpressure valve 20, which when a preset pressure has been reached opens suddenly and releases the water into the spray ring 21 of the toilet bowl 22, which spray ring 21 distributes the water for the flushing process in the bowl. The quantity of water used for an individual flushing action is limited as is common in aircraft. The water quantity available depends on the diameter and the piston travel of the water chamber, and thus depends on the design type. The flushing pressure depends on the ratio between the piston diameter of the water chamber and of the vacuum chamber of the cylinder combination 19 as well as on the spring pressure of the directional control valve 23, which is for example an overpressure valve 23. This spring pressure can be adjusted so as to influence the flushing intensity. The ratio of piston sizes is selected such that adequate flushing function is ensured even during blower operation on the ground.

The directional control valve is controlled electromagnetically and switches the vacuum from the vacuum system to the corresponding piston end, depending on the function which the cylinder combination 19 has to carry out.

After the rinsing procedure the waste matter in the toilet bowl together with the rinse water is removed by suction, by way of the flush valve 28, into the vacuum system 29.

In other words the pressure cylinder combination 19 comprises two opposing cylinders which at a defined space in relation to each other are arranged on an axis, and comprise pistons that are rigidly interconnected by way of their piston rod, so that the piston of the first cylinder follows the position of the piston of the second cylinder in parallel, wherein the first cylinder is used for sucking in and ejecting clear water, and the second cylinder by way of applying the vacuum from a connected vacuum system 29, at the corresponding piston end, moves the piston of the first cylinder.

Controlling the second cylinder takes place with a vacuum by way of a directional control valve 23 in which at least one of the inlets can be switched to the vacuum of the vacuum system 29, and a second inlet can be aerated against the cabin air so that, when the directional control valve 23 is switched over, this order is reversed and in this way the inlets of the second cylinder of the cylinder combinations are switched in the reverse order, which results in movement of the piston of the second cylinder and of the piston of the first cylinder, which piston is rigidly connected to said piston of the second cylinder. This process is alternately repeatable any number of times, including in reverse sequence.

According to one embodiment of the present invention the directional control valve 23 can be activated electromagnetically.

For example, the directional control valve 23 can be designed as a four/two-way directional control valve. The piston of the second cylinder for example travels the same way as the piston of the first cylinder; however, the diameter of said first cylinder is larger. For example, the first cylinder can comprise surface materials and sealing materials that are water resistant. Correspondingly, the second cylinder can comprise surface materials and sealing materials that are resistant to air.

The piston of at least one of the two cylinders can be a membrane. Furthermore, a nonreturn valve 18 can be provided which prevents any return flow of clear water from the first cylinder. Likewise, according to one embodiment an overpressure valve 20 is provided, against which the clear water, that in the second work cycle of the first cylinder is pressed out of the cylinder, is pressed.

The overpressure valve 20 is spring loaded and its opening pressure is settable so that when a previously set pressure is reached the clear water that is pressed against the overpressure valve 20 opens all of a sudden, and the clear water is suddenly sprayed into the toilet bowl 22 by way of the spray ring 21 so as to achieve improved cleaning action as a result of the sudden pulse effect which the clear water has on the contents to be flushed away.

Emptying the sinks of the galleys also takes place by way of the vacuum system. To this effect the water that arises is collected underneath the sink in a collecting basin and is released to the vacuum system by way of a float valve, similar to the above-described overflow function of the treatment stage or of the clear-water storage tank.

To this effect, on the floor of the collecting basin an automatic flush valve, similar to the flush valve 28, can be installed on the toilet bowl so that the collecting basin can be completely emptied at specified intervals. The flush valve can be opened manually for drainage purposes.

Oxidation of the hydrogen molecules within the housing 40 of the treatment device 7, 8 for example may take place by way of a catalyst 13. Heat removal of the catalyst is for example ensured by way of a valve 10.

The flushing process of the toilet bowls 22 may take place manually by activating an electrical release.

All the waste water of the aircraft is collected in the waste-water tanks and is disposed off after landing, or its liquid fraction is reduced by special processes, wherein the liquid obtained in this way is cleaned to the extent that it can either be expelled to the outside air during flight, or it can be led to reuse in a reformer process to obtain hydrogen from an energy carrier containing hydrocarbons (e.g. kerosene).

FIG. 2 is a diagrammatic cross sectional view of an aircraft with a grey-water utilisation system according to one embodiment of the present invention. As already shown in FIG. 1, the grey-water utilisation system comprises a grey-water treatment device 31, a waste-water collection tank 36, a vacuum system 29 and a vacuum generator 37. Furthermore a potable-water tank 35 is provided. As an alternative, additional potable water can be supplied from a fuel cell system (not shown in FIG. 2). The waste water from the galleys 33 is fed to the waste-water collection tank 36 by way of the vacuum system 29. Grey water from the lavatory basin 3 is treated to become odourless clear water and is used for flushing the toilets 22. Freight compartment drainage is by way of drainage valves embedded in the fuselage, or alternatively by way of removal by suction into the waste-water collection tank 36. Reference character 34 designates a potable-water line.

Implementation of the invention is not limited to the preferred embodiments shown in the figure. Instead, a multitude of variants are imaginable which use the solution shown and the principle according to the invention-even in the case of fundamentally different embodiments.

In addition it should be pointed out that "comprising" does not exclude other elements or steps, and "a" or "one" does not exclude a plural number. Furthermore, it should be pointed out that characteristics or steps which have been described with reference to one of the above embodiments can also be used in combination with other characteristics or steps of other embodiments described above. Reference characters in the claims are not to be interpreted as limitations.

The invention claimed is:

1. A grey-water utilisation system for an aircraft, comprising:
 a grey-water treatment device having a housing;
 a waste-water collection tank; and
 a vacuum system;
 wherein the grey-water treatment device is designed to treat grey water so that it becomes first clear water, which subsequently can be used for flushing a toilet;
 wherein the grey water treatment device comprises an electroflotation stage designed to clean from the grey water any floatable materials contained in the water;
 wherein the vacuum system is designed to collect waste water in the waste-water collection tank; and
 wherein the electroflotation stage comprises oxidation means through which free hydrogen molecules are oxidised within the grey-water treatment device so that water is produced;
 the system further comprising a forced aeration device on the grey water treatment device, so that released hydrogen cannot leave the housing of the grey-water treatment device.

2. The grey-water utilisation system of claim 1,
 wherein the waste water comprises first flush water from the toilet or second rinse water from a galley region; and
 wherein the grey water comprises third rinse water from a wash basin.

3. The grey-water utilisation system of claim 1,
 wherein the grey-water treatment device is connected to a wash basin and to the toilet such that third rinse water from the wash basin can be treated in the grey-water treatment device so that it turns into second clear water and can subsequently be fed to the toilet.

4. The grey-water utilisation system of claim 1,
the grey water treatment device further comprising a filtration stage;
wherein the filtration stage is designed to filter the grey water.

5. The grey-water utilisation system of claim 2, further comprising
a first collecting basin, in which the second rinse water from the galley region is collectable and is releasable to the vacuum system by way of an overflow device with a float valve or by way of a suction valve on the bottom of the first collecting basin.

6. The grey-water utilisation system of claim 1, further comprising
a separate drainage device for draining a freight compartment of the aircraft, wherein the drainage device comprises drainage valves embedded in the fuselage, or is connected to the vacuum system by way of a second collecting basin.

7. The grey-water utilisation system of claim 1, further comprising
a clarifier-foam suction device designed to remove, by suction, a clarifier foam from the treatment stage by way of the vacuum system; or a first overflow installed on the grey-water treatment device.

8. The grey-water utilisation system of claim 1, wherein the first or second clear water is collectable in an intermediate container; and
wherein the intermediate container comprises a second overflow.

9. The grey-water utilisation system of claim 1, further comprising
a first drainage device,
wherein the grey water treatment device can be drained using the first drainage device; or
a second drainage device, wherein an intermediate container can be drained using the second drainage device.

10. The grey-water utilisation system of claim 9, further comprising
a pressure cylinder combination and a spray ring;
wherein clear water can be sucked from the intermediate container by means of the pressure cylinder combination; and
wherein the clear water can subsequently be fed into the toilet by way of the spray ring.

11. The grey-water utilisation system of claim 1,
further comprising an electronic control device;
wherein the electronic control device is designed to automatically control the grey-water utilisation system; and
wherein the electronic control device is redundant so that in the case of failure or malfunction of a first part of the electronic control device, a second part of the electronic control device can take over the function of the first part.

12. The grey-water utilisation system of claim 1, further comprising a sensor arrangement;
wherein in the case of a water shortage in an intermediate container the water shortage can be detected by way of the sensor arrangement; and
wherein after detection of the water shortage during a washing procedure a water cock of the wash basin remains open until this water shortage has been remedied.

13. The grey-water utilisation system of claim 1, further comprising
a direct voltage source whose polarity can be reversed,
wherein a polarity of the direct voltage, provided by the direct voltage source, which direct voltage is applied to electrodes of the electroflotation stage, can periodically be reversed so as to prevent hydroxides from being deposited on the electrodes.

14. An aircraft comprising
a grey-water utilisation system comprising
a grey water treatment device having a housing;
a waste-water collection tank; and
a vacuum system;
wherein the grey-water treatment device is designed to treat grey-water so that it becomes first clear water, which subsequently can be used for flushing a toilet;
wherein the grey water treatment device comprises an electroflotation stage designed to clean from the grey water any floatable materials contained in the water;
wherein the vacuum system is designed to collect waste water in the waste-water collection tank; and
wherein the electroflotation stage comprises oxidation means through which free hydrogen molecules are oxidised within the grey-water treatment device so that water is produced;
the aircraft further comprising a forced aeration device on the grey water treatment device, so that released hydrogen cannot leave the housing of the grey-water treatment device.

15. A grey-water utilisation system for an aircraft comprising
a grey water treatment device comprising a first overflow;
a waste-water collection tank;
a vacuum system; and
an intermediate container;
wherein the grey-water treatment device is designed to treat grey water so that it becomes first clear water, which is collectable in the intermediate container and subsequently can be used for flushing a toilet;
wherein the first overflow is installed on the grey water treatment device and wherein the intermediate container comprises a second overflow; and
wherein the vacuum system is designed to collect waste water in the waste-water collection tank.

16. The grey-water utilisation system of claim 15, further comprising
a first drainage device,
wherein the grey water treatment device can be drained using the first drainage device; or
a second drainage device, wherein the intermediate container can be drained using the second drainage device.

17. The grey-water utilisation system of claim 15, further comprising:
a pressure cylinder combination; and
a spray ring;
wherein clear water can be sucked from the intermediate container by means of the pressure cylinder combination; and
wherein the clear water can subsequently be fed into the toilet by way of the spray ring.

18. The grey-water utilisation system of claim 15, further comprising
a sensor arrangement;
wherein in the case of a water shortage in the intermediate container the water shortage can be detected by way of the sensor arrangement; and
wherein after detection of the water shortage during a washing procedure a water cock of the wash basin remains open until this water shortage has been remedied.

19. A grey-water utilisation system for an aircraft, comprising:
- a grey-water treatment device;
- a waste-water collection tank;
- a vacuum system; and
  - a clarifier-foam suction device designed to remove, by suction, a clarifier foam from the treatment stage by way of the vacuum system, or
  - a first overflow installed on the grey-water treatment device;
- wherein the grey-water treatment device is designed to treat grey water so that it becomes first clear water, which subsequently can be used for flushing a toilet;
- wherein the grey water treatment device comprises an electroflotation stage designed to clean from the grey water any floatable materials contained in the water;
- wherein the vacuum system is designed to collect waste water in the waste-water collection tank.

20. A grey-water utilisation system for an aircraft, comprising:
- a grey-water treatment device;
- a waste-water collection tank; and
- a vacuum system;
- wherein the grey-water treatment device is designed to treat grey water so that it becomes first clear water, which subsequently can be used for flushing a toilet;
- wherein the grey water treatment device comprises an electroflotation stage designed to clean from the grey water any floatable materials contained in the water;
- wherein the vacuum system is designed to collect waste water in the waste-water collection tank;
- wherein the first or second clear water is collectable in an intermediate container; and
- wherein the intermediate container comprises a second overflow.

21. A grey-water utilisation system for an aircraft, comprising:
- a grey-water treatment device having a housing;
- a waste-water collection tank;
- a vacuum system; and
- a direct voltage source whose polarity can be reversed;
- wherein the grey-water treatment device is designed to treat grey water so that it becomes first clear water, which subsequently can be used for flushing a toilet;
- wherein the grey water treatment device comprises an electroflotation stage designed to clean from the grey water any floatable materials contained in the water;
- wherein the vacuum system is designed to collect waste water in the waste-water collection tank; and
- wherein a polarity of the direct voltage, provided by the direct voltage source, which direct voltage is applied to electrodes of the electroflotation stage, can periodically be reversed so as to prevent hydroxides from being deposited on the electrodes;
- the system further comprising a forced aeration device on the grey water treatment device, so that released hydrogen cannot leave the housing of the grey-water treatment device.

* * * * *